(12) United States Patent
Ribaldone et al.

(10) Patent No.: US 9,809,108 B2
(45) Date of Patent: Nov. 7, 2017

(54) AIR GUIDING DEVICE FOR A MOTOR-VEHICLE

(71) Applicant: C.R.F. Società Consortile per Azioni, Orbassano (Turin) (IT)

(72) Inventors: Enrico Modesto Ribaldone, Orbassano (IT); Giorgio Menzato, Orbassano (IT)

(73) Assignee: C.R.F. SOCIETA CONSORTILE PER AZIONI, Orbassano (Turin) (IT)

( * ) Notice: Subject to any disclaimer, the term of this patent is extended or adjusted under 35 U.S.C. 154(b) by 307 days.

(21) Appl. No.: 14/670,063

(22) Filed: Mar. 26, 2015

(65) Prior Publication Data
US 2017/0136872 A1    May 18, 2017

(30) Foreign Application Priority Data

May 13, 2014    (EP) ..................................... 14168127

(51) Int. Cl.
*B60K 11/08*    (2006.01)
*B60K 11/04*    (2006.01)
*B62D 25/08*    (2006.01)

(52) U.S. Cl.
CPC ............ *B60K 11/085* (2013.01); *B60K 11/04* (2013.01); *B62D 25/085* (2013.01)

(58) Field of Classification Search
CPC ...... B60K 11/08; B60K 11/085; B60K 6/365; B60K 11/00
See application file for complete search history.

(56) References Cited

U.S. PATENT DOCUMENTS

| | | | |
|---|---|---|---|
| 4,653,788 A * | 3/1987 | Di Giusto | B60K 11/08 188/264 A |
| 4,673,206 A | 6/1987 | Kretschmer et al. | |
| 7,086,692 B2 * | 8/2006 | Sebastian | B60K 11/00 296/198 |

(Continued)

FOREIGN PATENT DOCUMENTS

| | | |
|---|---|---|
| CH | 175839 | 5/1934 |
| DE | 3630435 A1 | 3/1988 |

(Continued)

OTHER PUBLICATIONS

European Search Report for corresponding European Patent Application No. 14168127.0 filed May 13, 2014, completed Dec. 3, 2014.

*Primary Examiner* — Hau V Phan
(74) *Attorney, Agent, or Firm* — Heslin Rothenberg Farley & Mesiti P.C.; Victor A. Cardona, Esq.

(57) ABSTRACT

An air guiding device for a motor-vehicle includes a main chamber located at the rear of a front wall of the motor vehicle, and defined between the front wall, a rear wall which is spaced apart from the front wall and two side walls. A first opening is provided on the front wall, for the inlet of air into the main chamber, while at least one second opening on said rear wall guides the air into an engine compartment. Two side ducts extend from an inlet to an outlet giving out on a respective outer side wall of the motor-vehicle. To the second opening there is associated a device for controlling the air flow therethrough. The outlets of the two side ducts are arranged and oriented so as to generate a substantially flattened and vertical air curtain adjacent to each front wheel of the motor-vehicle.

14 Claims, 4 Drawing Sheets

(56) References Cited

U.S. PATENT DOCUMENTS

| | | | | |
|---|---|---|---|---|
| 7,766,111 B2* | 8/2010 | Guilfoyle | B60K 11/04 | 180/68.1 |
| 7,886,859 B2* | 2/2011 | Caldirola | B60K 11/08 | 123/41.59 |
| 8,091,668 B2* | 1/2012 | Amano | B60K 6/365 | 123/41.05 |
| 8,118,124 B2* | 2/2012 | Shin | F01P 7/12 | 180/68.1 |
| 8,631,889 B2* | 1/2014 | Begleiter | B60T 5/00 | 180/68.1 |
| 8,794,363 B2* | 8/2014 | Wolf | B60K 11/085 | 180/68.1 |
| 8,998,293 B2* | 4/2015 | Glickman | B60K 11/08 | 180/68.1 |
| 9,004,241 B2* | 4/2015 | Browne | F16D 65/847 | 188/264 A |
| 2004/0226764 A1* | 11/2004 | Iwasaki | F01P 3/20 | 180/68.1 |
| 2010/0243352 A1* | 9/2010 | Watanabe | B60K 11/085 | 180/68.1 |
| 2012/0090906 A1* | 4/2012 | Charnesky | B60K 11/085 | 180/68.1 |
| 2013/0223980 A1* | 8/2013 | Pastrick | F01D 5/00 | 415/1 |
| 2014/0216834 A1* | 8/2014 | Elliott | B60K 11/085 | 180/68.1 |
| 2015/0101550 A1* | 4/2015 | Nam | B60K 11/08 | 123/41.33 |
| 2015/0274104 A1* | 10/2015 | Schneider | B60K 11/06 | 180/68.1 |
| 2015/0343893 A1* | 12/2015 | Nam | B60K 11/085 | 701/49 |

FOREIGN PATENT DOCUMENTS

| | | |
|---|---|---|
| DE | 102008022554 A1 | 11/2009 |
| EP | 0213387 A2 | 3/1987 |
| EP | 1705104 B1 | 9/2006 |
| FR | 2041369 A5 | 1/1971 |
| FR | 2858796 A1 | 2/2005 |
| FR | 2912984 A1 | 8/2008 |

* cited by examiner

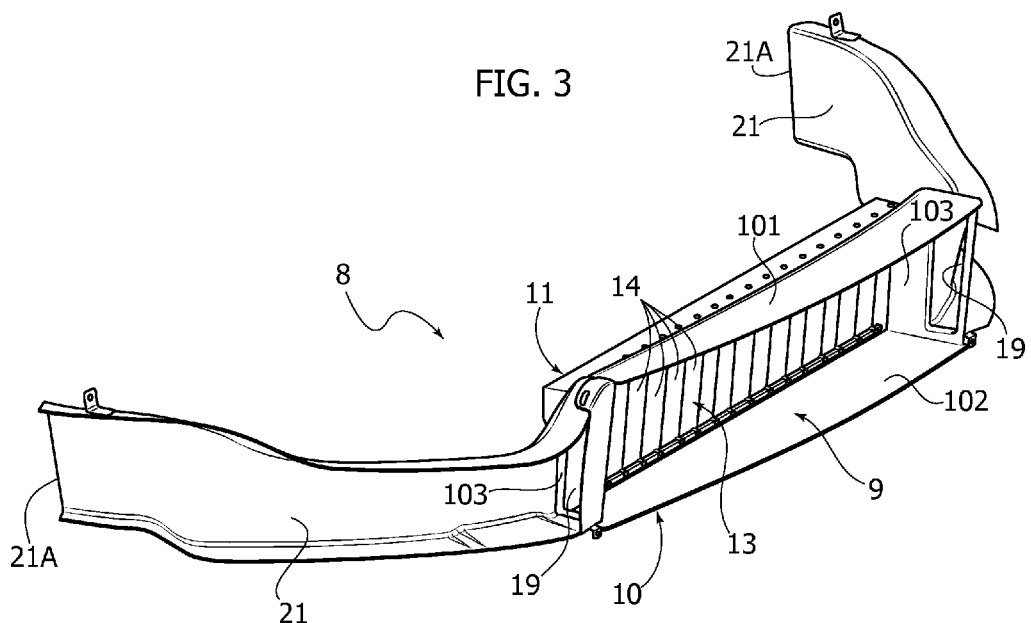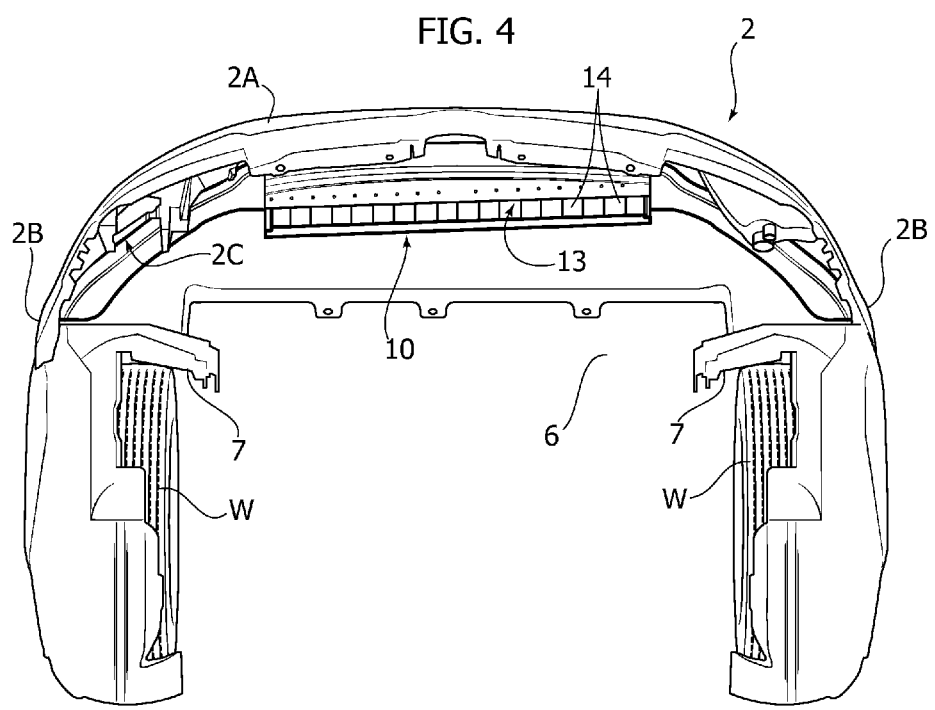

AIR GUIDING DEVICE FOR A MOTOR-VEHICLE

CROSS REFERENCE TO RELATED APPLICATIONS

This application claims priority from European patent application No. 14168127.0 filed on May 13, 2014, the entire disclosure of which is incorporated herein by reference.

FIELD OF THE INVENTION

The present invention relates to an air guiding device for a motor-vehicle (such as a car, lorry or truck) of the type comprising:
a main chamber located at the rear of a front wall of the motor-vehicle and defined between said front wall, a rear wall spaced apart from said front wall, an upper wall, a lower wall and two side walls,
at least one first opening on said front wall, for the inlet of air into said main chamber,
at least one second opening on said rear wall, for guiding the air towards the engine compartment of the motor-vehicle,
two side ducts, each extending from an inlet located on a respective side wall of the main chamber to an outlet giving out on a respective outer side wall of the motor-vehicle.

PRIOR ART

An air guiding device of the above indicated type is described in FR-A-2 912 984. In this known device the two side ducts give out on the outer side walls of the motor-vehicle, along a direction which is substantially transverse with respect to the longitudinal direction of the motor-vehicle. The purpose of the side ducts in this known solution is that of generating transverse air jets which are for reducing the negative pressure which is created on one side of the vehicle during travel under transverse wind.

Also known in the art (FR-A-2 858 796) is the provision of air-guiding side ducts at the front part of a motor-vehicle which are shaped and arranged to generate an air curtain adjacent to each front wheel of the motor-vehicle, on the outer side thereof, for the purpose of improving the aerodynamic drag of the motor-vehicle, by reducing or avoiding air vortices at the wheel area.

Further known solutions of this type are disclosed in CH-A-175 839 and DE 36 30 435 A1.

Document EP 1 705 104 B1 discloses a solution of the same type as that of FR-A-2 912 984 in which there are further provided two doors for obstructing the air-guiding side ducts, these doors being connected to each other by a mechanical transmission and being automatically operated by the side wind, so as to generate a transverse air jet coming out from the outer side wall of the vehicle only on the side which is at negative pressure.

All the above described known solutions have the drawback that they do not enable any kind of adjustment of the quantity of air which flows through the side ducts giving out on the outer side walls of the motor vehicle nor any adjustment of the quantity of air which is instead fed to the engine compartment of the motor-vehicle.

OBJECT OF THE INVENTION

The object of the present invention is that of providing a device of the type indicated at the start of the present description which can be used for reducing the aerodynamic drag of the motor-vehicle, is simple and efficient and at the same time enables the airflow entering into the main chamber to be adjustably distributed between said side ducts which give out on the outer side walls of the vehicle and the passage for feeding air to the engine compartment of the vehicle.

SUMMARY OF THE INVENTION

In view of achieving this object, the invention provides an air guiding device for a motor-vehicle, comprising:
a main chamber located at the rear of a front wall of the motor vehicle and defined between said front wall, a rear wall which is spaced apart from said front wall and two side walls,
at least one first opening on said front wall, for the inlet of air into said main chamber,
at least one second opening on said rear wall, for guiding the air towards the engine compartment of the motor vehicle,
two side ducts, each extending from an inlet located on a respective side wall of the main chamber to an outlet giving out on a respective outer side wall of the motor-vehicle,
said device being characterized in that:
to said second opening there is associated a device for controlling the air flow through said second opening, and in that
the outlets of the two side ducts are arranged and oriented so as to generate a substantially flattened and vertical air curtain adjacent to each front wheel of the motor-vehicle, on the outer side thereof.

According to a further preferred feature, said device for controlling the air flow directed towards the engine compartment of the motor-vehicle through said second opening is constituted by a device with orientable louvers controlled by an electric control unit on the basis of one or more parameters, such the value of the temperature of the engine cooling fluid, the air temperature in the motor-vehicle intercooler, the pressure in the condenser of the air conditioning system, and in some cases also the vehicle speed.

Due to this feature, the device for adjusting the flow through the second opening is able to continuously adjust the airflow through said second opening between a zero value (corresponding to a complete obstruction of the second opening) and a maximum value, depending upon the cooling needs of the engine of the motor-vehicle. Therefore, on one hand, the device according to the invention provides an improvement of the aerodynamic drag of the motor-vehicle in normal travel conditions, due to the air curtains generated on the outer sides of the rear wheels, but on the other hand it enables a maximum quantity of air to be fed to the engine compartment in transient conditions in which this is desired in order to obtain an efficient cooling of the engine.

In a preferred embodiment, said main chamber is defined by a structure secured on the rear side of a front bumper of the motor-vehicle and defining a peripheral frame structure forming said second opening which communicates with the engine compartment and acting as a support for the flow adjustment device for regulating the flow through the second opening. This peripheral frame structure comprises an upper wall and a lower wall and two side walls which confine said main chamber. The side walls are planar walls inclined by an angle (which is about 45° in the illustrated example) with respect to the longitudinal direction of the motor-vehicle, so that they result to be facing towards the motor-vehicle forward direction. This provides a high air flow through the inlet apertures of the two side ducts of the device, which are formed at said side walls of the peripheral frame structure. Also in the case of said preferred embodiment, the two side ducts are formed by two channel-like structures secured to the rear surface of the front bumper of the motor-vehicle, so that they define said side ducts along with this surface.

According to a further feature of the preferred embodiment, the side ducts have outlet ends shaped so as to generate a substantially flattened and vertical air curtain directed along a direction substantially parallel to the longitudinal direction of the motor-vehicle adjacent to the respective front wheel, on the outer side thereof.

As indicated above, the air curtains prevent formation of air vortices at the front wheel areas improving thereby the aerodynamic characteristics of the motor-vehicle.

BRIEF DESCRIPTION OF THE DRAWINGS

Further features and advantages of the invention will become apparent from the following description with reference to the annexed drawings, given purely by way of non limiting example, in which:

FIG. 3 is a perspective view of the structure of the device according to the invention, FIG. 4 is a plan view partially in cross-section of the front part of the motor-vehicle of FIG. 1, FIGS. 5-7 are views corresponding to that of FIG. 4 which show the device of invention in three different operative conditions.

DETAILED DESCRIPTION OF A PREFERRED EMBODIMENT

Figure 1:
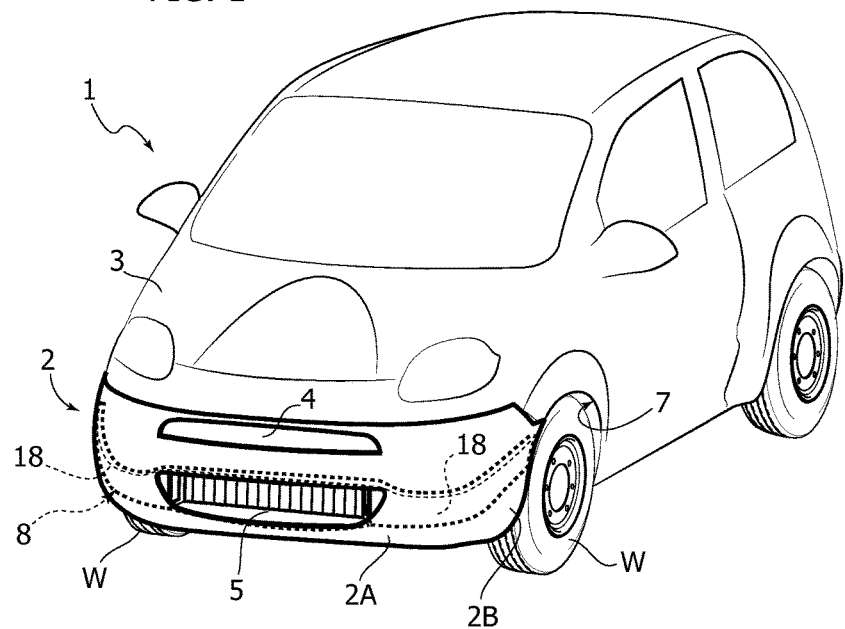
FIG. 1 is a perspective view of a motor-vehicle including a front bumper provided with the device according to the invention.
Figure 2:
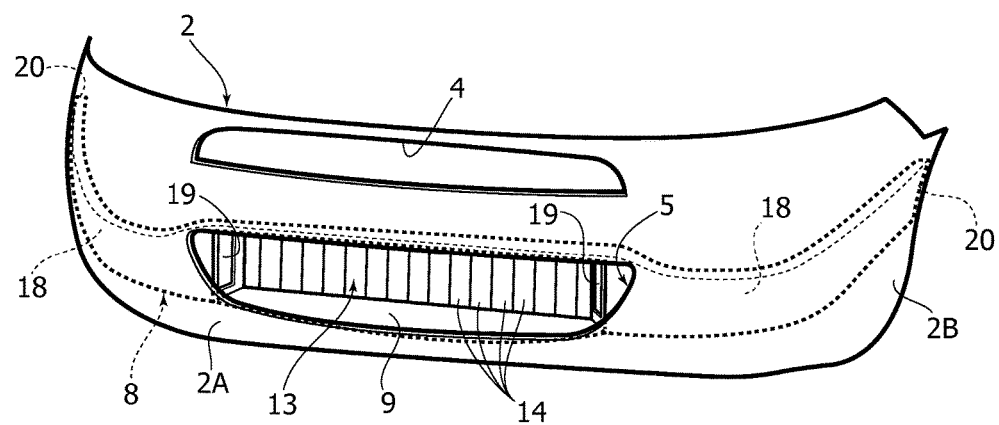
FIG. 2 is a perspective view at an enlarged scale of the front bumper of the motor-vehicle.
Figure 5:
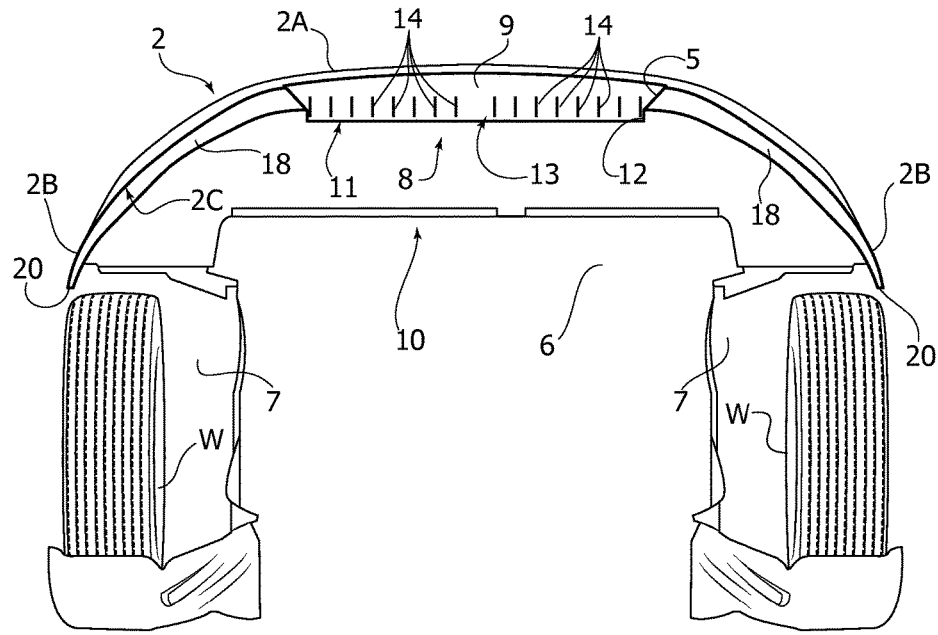

In FIG. 1, reference numeral 1 generally designates a motor-vehicle provided with a front bumper 2 secured in a known manner to the body 3. In the illustrated example, the bumper 2 has a body of plastic material, including an upper opening 4 (FIG. 2) and a lower opening 5, which are horizontally elongated and both communicating with the engine compartment 6 (FIGS. 4-7) located at the rear of the bumper 2. Also in the case of the illustrated example, the bumper has a front wall 2A which extend laterally into two side portions 2B facing towards the wheel compartments 7 defined by a body 3, in which the front wheels W are arranged.

At the rear of wall 2A of bumper 2 there is provided an air guiding device generally designated by reference numeral 8. Device 8 comprises a main chamber 9 having a horizontally elongated configuration which substantially corresponds to the configuration of opening 5 of the bumper.

Figure 8:
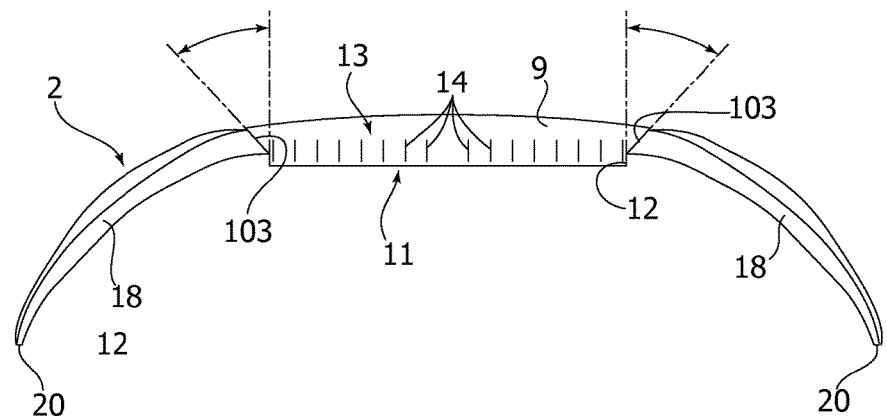
FIG. 8 is a diagrammatic illustration, in plan view and in cross-section, of the device according to the invention.

With reference to FIG. 3, the main chamber 9 is defined, in the specific illustrated example, by a peripheral frame 10 including a substantially planar upper wall 101, a substantially planar lower wall 102 and two side walls 103 inclined by an angle (which in the specific illustrated example is about 45°) with respect to the longitudinal direction of the motor vehicle (see FIG. 8) so as to be facing forwardly in the forward direction of the motor vehicle. The rear edge of the upper and lower walls 101, 102 and the two side walls 103 define the rear wall of the main chamber 9, in which there is formed the opening 12 for communication of chamber 9 with the engine compartment 6. The plane of the rear wall 11 is parallel and spaced apart with respect to the front wall of the main chamber 9 which is constituted by the rear surface 2C (FIGS. 5-7) of bumper 2.

The airflow through the opening 12 of the rear wall 11 of the main chamber 9 is controlled by a flow adjustment device 13, which in the illustrated example is constituted by an array of orientable louvers 14 which are pivotally mounted around respective axes which are parallel and spaced apart from each other. In the illustrated example, the oscillation axes of louvers 14 are vertical, but it is naturally possible to provide louvers with horizontal oscillation axes. The orientable louver device 14 is not described nor shown in detail, since it can be made in any known way, with orientable louvers 14 controlled by a linkage which on its turn is driven by an electric actuator. The electric actuator, which can be of any known type (typically an electric motor) is controlled by the electronic control unit of the motor-vehicle on the basis of a signal responsive to a temperature value, typically the temperature of the engine cooling fluid. The control unit is programmed for holding louvers 14 at the position in which they are oriented parallel to the longitudinal direction of the motor vehicle (FIG. 5), corresponding to the maximum airflow through opening 12 providing access to the engine compartment 6, when the temperature of the cooling fluid has a value which indicates the need of feeding as much quantity of air as possible to the engine compartment 6, in which the radiator of the engine cooling system is arranged. When the value of the temperature decreases, the control unit causes a progressive closing of the louvers 14 (see FIG. 6) until they reach a condition of complete obstruction of opening 12 (FIG. 7) in which louvers 14 are oriented in a plane transversal to the longitudinal direction of the motor vehicle, thus obstructing the opening 12 completely.

Figure 6:
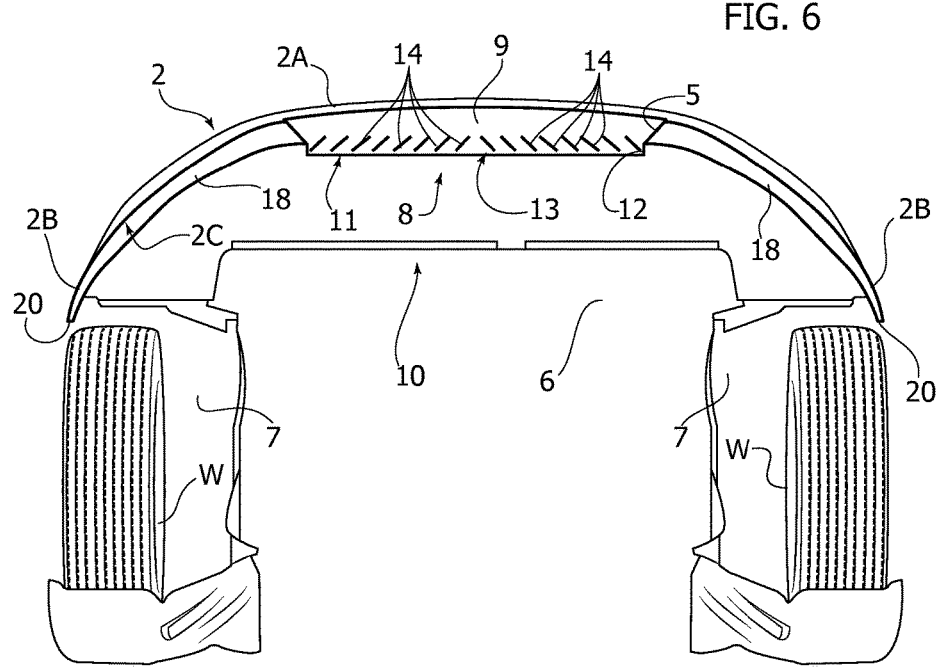
Figure 7:
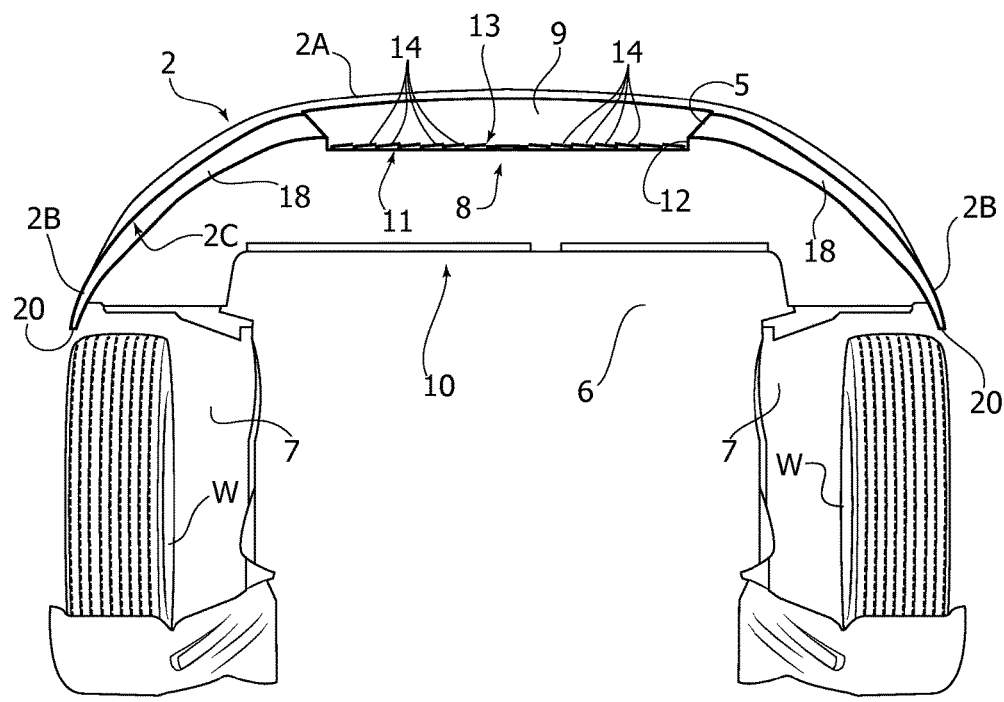

As clearly shown in FIG. 6, louvers 14 are grouped in two symmetrical arrays of louvers which have symmetrical movements with respect to the median plane of the motor vehicle. In particular, when louvers 14 are in a partially opened (or partially closed condition), as illustrated in FIG. 6, they are oriented so as to guide the airflow impinging thereon towards the sides of the engine compartment 6.

Still with reference to the drawings, the air guiding device 8 comprises two side ducts 18 each extending from an inlet constituted by an aperture 19 formed at the respective side wall 103 of the peripheral frame 10 to an outlet 20 giving out on a respective outer side wall of the motor-vehicle.

In the embodiment which is illustrated herein, the side ducts 18 are defined between the rear surface of the bumper 2 and two channel-like structures 21, made of sheet-metal, each having one end connected to the respective side wall 103 of the peripheral frame 10 and the opposite end secured against the inner surface of bumper 2, so that the end edge 21A of each channel-like element 21 (FIG. 3) defines— along with the inner surface of bumper 2—an outlet aperture 20 which is configured as a vertically extending slot, arranged and oriented as shown in FIGS. 4-8, so as to generate two substantially flattened and vertical air curtains adjacent to each front wheel W of the motor-vehicle, on the outer side thereof.

During travel of the motor-vehicle, the electronic control unit attends to holding the flow adjusting device 13 at the position which is most suitable for the actual operating condition of the engine. In normal conditions, when the radiator of the engine cooling system does not require feeding an additional airflow with respect to that which enters into the engine compartment through the upper opening 4 of bumper 2, the louver adjustment device 13 is held in the position of total obstruction of opening 12 (FIGS. 3, 7) so that the entire airflow which enters into the main chamber 9 through the front opening 5 is guided into the two side ducts 18. The airflow enters into ducts 18 through the inlet apertures 19, with no excessive decrease in speed, due to that the side wall 103 of the main chamber 9 are oriented so as to be partially facing forwardly, in the forward direction of the motor-vehicle. Thus, a flow of sufficient energy is obtained at the exit from slots 20, which therefore generates an efficient air curtain on one side of each front wheel, ensuring a reduction and/or a complete elimination of air vortices within the wheel compartments 7, to advantage for the aerodynamical characteristics of the vehicle.

At the same time, where the engine requires a maximum airflow to the radiator for an efficient cooling, device 13 leaves opening 12 for access to the engine compartment 6 completely opened, which generates a substantial flow to be guided through opening 5 into the engine compartment. In this condition, the portion of air which is able to enter into the side ducts 18 is very reduced, which is a desired condition, since in this transient situation an efficient cooling of the engine must be preferred. The adjustment device with orientable louvers which has been described herein represents naturally only one example, since this device can be made in a different way, for example with horizontally extending orientable louvers, or for example also with a roller shutter or any other type of shutter. Both in this respect, and also in respect of any other detail of construction, the embodiments may widely vary with respect to what has been described, while the principle of the invention remains the same, without departing from the scope of the invention.

What is claimed is:

1. A motor vehicle comprising an air guiding device for a motor-vehicle, the air guiding device comprising:
    a main chamber located at a rear of a front wall of a motor-vehicle, said main chamber defined between said front wall, a rear wall spaced apart from said front wall, an upper wall, a lower wall and two side walls,
    at least one first opening on said front wall to allow air to flow into said chamber,
    at least one second opening on said rear wall, for guiding air to an engine compartment of the motor-vehicle,
    two side ducts, each extending from an inlet located at a respective side wall of the main chamber to an outlet giving out on a respective outer side wall of the motor vehicle,
    a flow control device for controlling an airflow through said second opening,
    wheel compartments defined by a body and receiving wheels of the vehicle, and
    the outlets of the two side ducts arranged and oriented so as to generate a substantially flattened and vertical air curtain in a form of a planar air blade, parallel to a vertical longitudinal plane of the motor-vehicle and located adjacent to each front wheel of the motor-vehicle, on the outer side thereof, in such a way as to provide a reduction and/or a complete elimination of air vortices within the wheel compartments.

2. The motor vehicle according to claim 1, wherein the side walls of said main chamber are inclined by about 45° with respect to a longitudinal direction of the motor-vehicle, so as to be facing forwardly, in the advancement direction of the motor-vehicle.

3. The motor vehicle according to claim 2, wherein outlet apertures of the side ducts are configured as vertically elongated slots adapted to direct an air jet along a direction substantially parallel to the longitudinal direction of the motor-vehicle, in a plane adjacent to the respective front wheel on the outer side thereof.

4. The motor vehicle according to claim 2, wherein said front wall is a wall of a front bumper of the motor vehicle.

5. The motor vehicle according to claim 1, wherein outlet apertures of the side ducts are configured as vertically elongated slots adapted to direct an air jet along a direction substantially parallel to the longitudinal direction of the motor-vehicle, in a plane adjacent to the respective front wheel on the outer side thereof.

6. The motor vehicle according to claim 5, wherein said front wall is a wall of a front bumper of the motor vehicle.

7. The motor vehicle according to claim 1, wherein said front wall is a wall of a front bumper of the motor vehicle.

8. The motor vehicle according to claim 7, wherein said main chamber is defined by a peripheral frame having an upper wall, a lower wall and two side walls, said peripheral frame being secured against an inner surface of the front wall of the bumper, so as to define said main chamber, said peripheral frame acting also as a support for said adjustment device.

9. The motor vehicle according to claim 8, wherein the two side ducts are defined by two channel-like elements secured against the inner surface of the bumper so as to define therewith said side ducts.

10. The motor vehicle according to claim 9, wherein said channel-like elements have one end anchored to said peripheral frame and an opposite end secured to the wall of the bumper, and having one end edge arranged at a distance from the inner surface of the bumper so as to define therewith two vertically elongated slots defining said outlet apertures of the said ducts.

11. The motor vehicle according to claim 1, wherein said front wall is a wall of a front bumper of the motor vehicle.

12. The motor vehicle according to claim 1, wherein said front wall is a wall of a front bumper of the motor vehicle.

13. An air guiding device for a motor-vehicle, comprising:
    a main chamber located at a rear of a front wall of a motor-vehicle, said main chamber defined between said front wall, a rear wall spaced apart from said front wall, an upper wall, a lower wall and two side walls,
    at least one first opening on said front wall to allow air to flow into said chamber,
    at least one second opening on said rear wall, for guiding air to an engine compartment of the motor-vehicle,
    two side ducts, each extending from an inlet located at a respective side wall of the main chamber to an outlet giving out on a respective outer side wall of the motor vehicle,
    a flow control device for controlling an airflow through said second opening, and
    the outlets of the two side ducts arranged and oriented so as to generate a substantially flattened and vertical air curtain adjacent to each front wheel of the motor-vehicle, on the outer side thereof;
    wherein the device for controlling the airflow through the second opening is a device with orientable louvers which is controlled by an electronic control unit on the basis of one or more parameters, the parameters comprising a value of a temperature of the engine cooling fluid, an air temperature at the motor-vehicle intercooler, a pressure within the condenser of the air conditioning system or the vehicle speed, wherein the device with orientable louvers comprises two arrays of louvers with vertical oscillation axes contained in a plane parallel to said rear wall and said orientable louvers form two groups which are symmetrically movable with respect to a median plane of the motor-vehicle, so that in the partially opened condition of the device with orientable louvers, these louvers tend to direct the airflow entering into the engine compartment towards the sides of the engine compartment.

14. A motor vehicle front end system for reducing an aerodynamic drag, the system comprising:

a main chamber located at a rear of a front wall of a motor-vehicle, said main chamber defined between said front wall, a rear wall spaced apart from said front wall, an upper wall, a lower wall and two side walls, at least one first opening on said front wall to allow air to flow into said chamber, at least one second opening on said rear wall, for guiding air to an engine compartment of the motor-vehicle, two side ducts, each extending from an inlet located at a respective side wall of the main chamber to an outlet giving out on a respective outer side wall of the motor vehicle, a flow control device for controlling an airflow through said second opening, wheel compartments defined by a body and receiving wheels of the vehicle, and the outlets of the two side ducts arranged and oriented so as to generate a substantially flattened and vertical air curtain in a form of a planar air blade, parallel to a vertical longitudinal plane of the motor-vehicle and located adjacent to each front wheel of the motor-vehicle, on the outer side thereof, in such a way as to provide a reduction and/or a complete elimination of air vortices within the wheel compartments.

* * * * *